(12) United States Patent
Spencer

(10) Patent No.: US 10,412,016 B2
(45) Date of Patent: Sep. 10, 2019

(54) STREAMING INFORMATION BASED ON AVAILABLE BANDWIDTH

(71) Applicant: salesforce.com, inc., San Francisco, CA (US)

(72) Inventor: Barry Spencer, Falmouth, ME (US)

(73) Assignee: salesforce.com, inc., San Francisco, CA (US)

(*) Notice: Subject to any disclaimer, the term of this patent is extended or adjusted under 35 U.S.C. 154(b) by 81 days.

(21) Appl. No.: 14/522,347

(22) Filed: Oct. 23, 2014

(65) Prior Publication Data

US 2015/0215223 A1 Jul. 30, 2015

Related U.S. Application Data

(60) Provisional application No. 61/933,573, filed on Jan. 30, 2014.

(51) Int. Cl.
*H04L 12/805* (2013.01)
*H04L 12/911* (2013.01)
*H04L 29/08* (2006.01)
*H04L 29/06* (2006.01)
*H04L 12/891* (2013.01)

(52) U.S. Cl.
CPC ............ *H04L 47/365* (2013.01); *H04L 47/41* (2013.01); *H04L 47/822* (2013.01); *H04L 69/14* (2013.01); *H04L 69/324* (2013.01); *H04L 69/325* (2013.01)

(58) Field of Classification Search
CPC ..... H04L 1/0002; H04L 47/10; H04L 47/263; H04L 47/822; H04L 47/365; H04L 47/41; H04L 65/80; H04L 65/608; H04L 69/14; H04L 69/324; H04L 69/325
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |

(Continued)

OTHER PUBLICATIONS

U.S. Appl. No. 13/998,890.

(Continued)

*Primary Examiner* — Peter Chen
(74) *Attorney, Agent, or Firm* — Dergosits & Noah LLP; Todd A. Noah

(57) ABSTRACT

A method and system for streaming information associated with a server and a computing system is described. The method may include increasing a packet size used for the streaming of information from a first packet size to a second packet size based on an identified increase in available bandwidth. The method further includes increasing a number of simultaneous connections used for the streaming of information from a first number of simultaneous connections to a second number of simultaneous connections based on the identified increase in available bandwidth in response to a determination that the second packet size equals a maximum packet size for a protocol used for the streaming of the information.

15 Claims, 11 Drawing Sheets

(56) References Cited

U.S. PATENT DOCUMENTS

| | | |
|---|---|---|
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B2 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,668,968 B1* | 2/2010 | Smith .................... G10L 19/24 370/229 |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0093982 A1* | 7/2002 | Joy .................... H04L 29/06 370/468 |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0029037 A1* | 2/2006 | Chen .................... H04L 29/06027 370/351 |
| 2008/0062877 A1* | 3/2008 | Chen .................... H04L 47/10 370/235 |
| 2009/0063415 A1 | 3/2009 | Chatfield et al. |
| 2009/0100342 A1 | 4/2009 | Rueben et al. |
| 2009/0177744 A1 | 7/2009 | Marlow et al. |
| 2012/0233137 A1 | 9/2012 | Jakobson et al. |
| 2013/0034012 A1* | 2/2013 | Oshiba .................... H04L 43/10 370/252 |
| 2013/0205002 A1* | 8/2013 | Wang .................... H04L 69/16 709/224 |
| 2013/0218948 A1 | 8/2013 | Jakobson |
| 2013/0218949 A1 | 8/2013 | Jakobson |
| 2013/0218966 A1 | 8/2013 | Jakobson |
| 2015/0294002 A1* | 10/2015 | Corbett .................... G06F 17/30457 707/693 |

OTHER PUBLICATIONS

U.S. Appl. No. 13/987,075.
U.S. Appl. No. 13/987,074.
U.S. Appl. No. 13/998,065.
U.S. Appl. No. 13/986,744.
U.S. Appl. No. 13/986,251.

* cited by examiner

STREAMING INFORMATION BASED ON AVAILABLE BANDWIDTH

CLAIM OF PRIORITY

This application claims priority to U.S. Provisional Patent App. No. 61/933,573, filed on Jan. 30, 2014, entitled "System and Method for Data Streaming Based On Available Bandwidth" by Barry Spencer, which is incorporated herein by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to data processing, and more specifically relates to enable streaming information based on available bandwidth.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

The following detailed description is made with reference to the technology disclosed. Preferred implementations are described to illustrate the technology disclosed, not to limit its scope, which is defined by the claims. Those of ordinary skill in the art will recognize a variety of equivalent variations on the description.

Existing approach for routing information in a network may generally be determined based on available bandwidth. However, this approach is constrained by the maximum packet size of the underlying protocol and may fail to take full advantage of the available bandwidth.

BRIEF SUMMARY

For some embodiments, methods and systems for streaming information based on available bandwidth includes increasing a packet size used for streaming information from a first packet size to a second packet size based on an identified increase in available bandwidth; and increasing a number of simultaneous connections used for the streaming information from a first number of simultaneous connections to a second number of simultaneous connections based on the identified increase in available bandwidth in response to a determination that the second packet size equals a maximum packet size for a protocol used for the streaming of information.

Other aspects and advantages of the present invention can be seen on review of the drawings, the detailed description and the claims, which follow.

BRIEF DESCRIPTION OF THE DRAWINGS

The included drawings are for illustrative purposes and serve only to provide examples of possible structures and process steps for the disclosed techniques. These drawings in no way limit any changes in form and detail that may be made to embodiments by one skilled in the art without departing from the spirit and scope of the disclosure.

DETAILED DESCRIPTION

Figure 1:
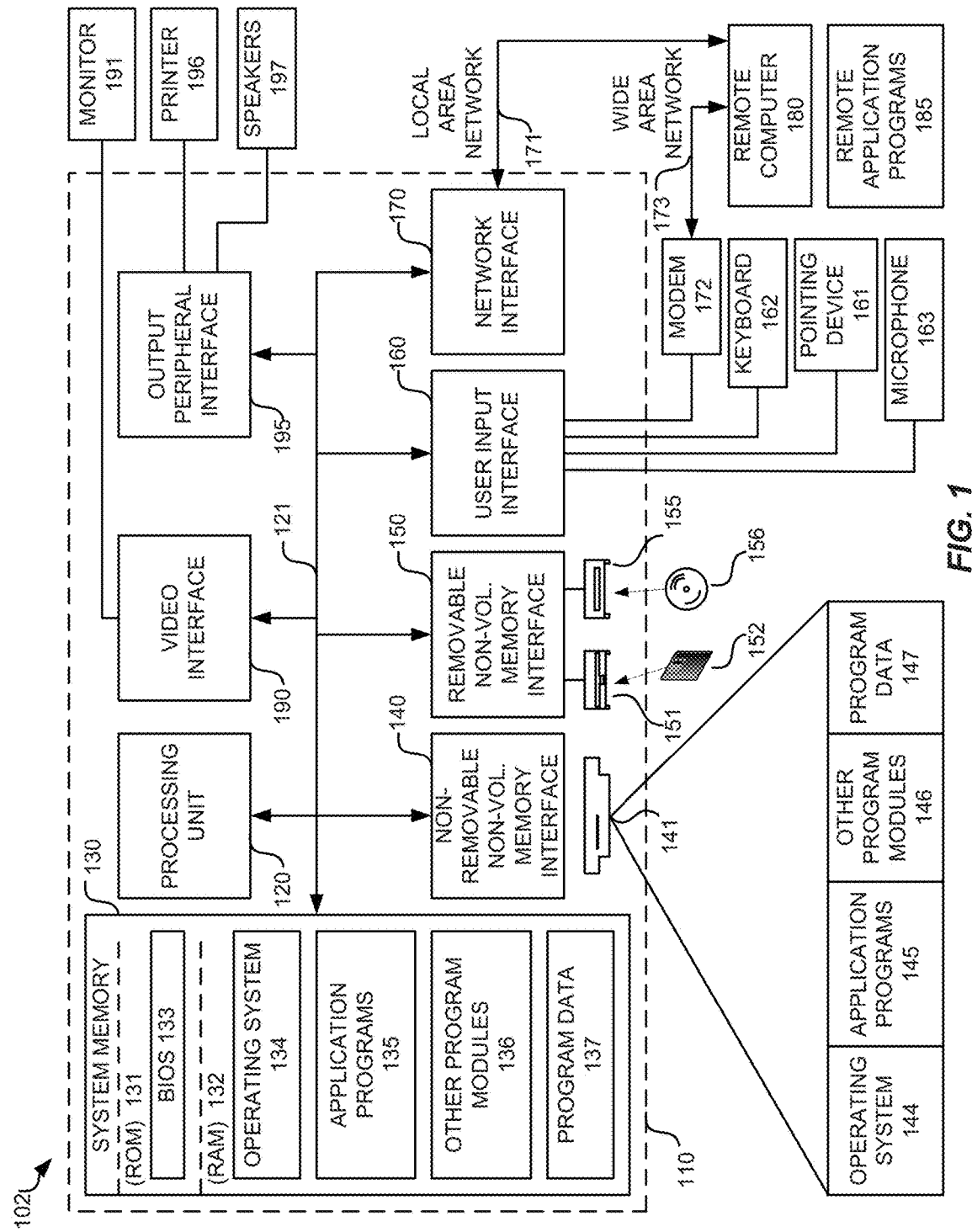
FIG. 1 shows a diagram of an example computing system 102 that may be used with some embodiments of the present invention.

Applications of systems and methods according to one or more embodiments are described in this section. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more embodiments may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

Media information may generally include audio information and/or video information. The media information may be shared or distributed from a source computing system to one or more destination computing systems via a media routing server. For example, the media information may be associated with a video conferencing application, screen sharing application, live audio application, etc. The sharing or exchanging of the media information may be based on a one-to-one, one-to-many, many-to-one, or many-to-many scheme.

Sequencing, prioritizing, error correction, and other operations or rules may be applied to the media information to enable timely delivery and to maintain acceptable user experience. These operations may vary depending on the type of media associated with the media information. For example, when the media information includes audio information, there is an expectation that the audio information is received continuously with minimal or no hitch. However, when the media information includes video information, the expectation may be less in comparison with audio information. This may be because minor hitches in the video information may be less annoying than hitches in the audio information, and the impact to the overall user experience may be minimal. As such, the routing of audio information may get higher priority than the routing of video information. Although the media information is used to refer to audio information and/or video information, it is possible that the media information may be associated with other types of information (e.g., images, texts, etc.).

The routing of media information may be associated with an underlying streaming of information between a routing server and a computing system. The streaming or transmission of the information may be based on the bandwidth of the destination computing systems, among others. It is possible that the bandwidth of a computing system may vary while data is being transmitted to or received from a routing server. Embodiments of the present invention may periodically determine the bandwidth of a computing system and may cause adjustments to be made to take advantage of a higher bandwidth.

The disclosed embodiments may include a method for streaming information based on available bandwidth. The method may include increasing a packet size used for streaming information from a first packet size to a second packet size based on an identified increase in available bandwidth, and increasing a number of simultaneous connections used for the streaming information from a first number of simultaneous connections to a second number of simultaneous connections based on the identified increase in available bandwidth in response to a determination that the second packet size equals a maximum packet size for a protocol used for the streaming of information.

The disclosed embodiments may include an apparatus for streaming information based on available bandwidth. The apparatus may include a processor, and one or more stored sequences of instructions which, when executed by the processor, cause the processor to increase a packet size used for streaming information from a first packet size to a second packet size based on an identified increase in available bandwidth, and to increase a number of simultaneous connections used for the streaming information from a first number of simultaneous connections to a second number of simultaneous connections based on the identified increase in available bandwidth in response to a determination that the second packet size equals a maximum packet size for a protocol used for the streaming of information.

The disclosed embodiments may include a machine-readable medium carrying one or more sequences of instructions for streaming information based on available bandwidth, which instructions, when executed by one or more processors, cause the one or more processors to increase a packet size used for streaming information from a first packet size to a second packet size based on an identified increase in available bandwidth, and to increase a number of simultaneous connections used for the streaming information from a first number of simultaneous connections to a second number of simultaneous connections based on the identified increase in available bandwidth in response to a determination that the second packet size equals a maximum packet size for a protocol used for the streaming of information.

The disclosed embodiments may be related to streaming information in a computer-implemented system. The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

FIG. 1 is a diagram of an example computing system that may be used with some embodiments of the present invention. The computing system 102 may be a source computing system that is configured to send or transmit media information (e.g., audio information, video information, a combination of audio and video information) to one or more destination computing systems connected to a network. For example, the media information may be associated with a screen sharing application that is configured to share screen information associated with the computing system 102. The computing system 102 may also be a destination computing system or both for the purpose of sharing or exchanging the media information.

The computing system 102 is only one example of a suitable computing system, such as a mobile computing system, and is not intended to suggest any limitation as to the scope of use or functionality of the design. Neither should the computing system 102 be interpreted as having any dependency or requirement relating to any one or combination of components illustrated. The design is operational with numerous other general purpose or special purpose computing systems. Examples of well-known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, mini-computers, mainframe computers, distributed computing environments that include any of the above systems or devices, and the like. For example, the computing system 102 may be implemented as a mobile computing system such as one that is configured to run with an operating system (e.g., iOS) developed by Apple Inc. of Cupertino, Calif. or an operating system (e.g., Android) that is developed by Google Inc. of Mountain View, Calif.

Some embodiments of the present invention may be described in the general context of computing system executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine readable media discussed below.

Some embodiments of the present invention may also be practiced in distributed computing environments where tasks are performed by remote processing devices that are linked through a communications network. In a distributed computing environment, program modules may be located in both local and remote computer storage media including memory storage devices.

Referring to FIG. 1, the computing system 102 may include, but are not limited to, a processing unit 120 having one or more processing cores, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computing system 102 typically includes a variety of computer readable media. Computer readable media can be any available media that can be accessed by computing system 102 and includes both volatile and nonvolatile media, removable and non-removable media. By way of example, and not limitation, computer readable media may store information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 102. Communication media typically embodies computer readable instructions, data structures, or program modules.

The system memory 130 may include computer storage media in the form of volatile and/or nonvolatile memory such as read only memory (ROM) 131 and random access memory (RAM) 132. A basic input/output system (BIOS) 133, containing the basic routines that help to transfer information between elements within computing system 102, such as during start-up, is typically stored in ROM 131. RAM 132 typically contains data and/or program modules that are immediately accessible to and/or presently being operated on by processing unit 120. By way of example, and not limitation, FIG. 1 also illustrates operating system 134, application programs 135, other program modules 136, and program data 137.

The computing system 102 may also include other removable/non-removable volatile/nonvolatile computer storage media. By way of example only, FIG. 1 also illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as, for example, a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing system 102. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. The operating system 144, the application programs 145, the other program modules 146, and the program data 147 are given different numeric identification here to illustrate that, at a minimum, they are different copies.

A user may enter commands and information into the computing system 102 through input devices such as a keyboard 162, a microphone 163, and a pointing device 161, such as a mouse, trackball or touch pad or touch screen. Other input devices (not shown) may include a joystick, game pad, scanner, or the like. These and other input devices are often connected to the processing unit 120 through a user input interface 160 that is coupled with the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computing system 102 may operate in a networked environment using logical connections to one or more remote computers, such as a remote computer 180. The remote computer 180 may be a personal computer, a handheld device, a server, a router, a network PC, a peer device or other common network node, and typically includes many or all of the elements described above relative to the computing system 102. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computing system 102 may be connected to the LAN 171 through a network interface or adapter 170. When used in a WAN networking environment, the computing system 102 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computing system 102, or portions thereof, may be stored in a remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that some embodiments of the present invention may be carried out on a computer system such as that described with respect to FIG. 1. However, some embodiments of the present invention may be carried out on a server, a computer devoted to message handling, handheld devices, or on a distributed system in which different portions of the present design may be carried out on different parts of the distributed computing system.

Another device that may be coupled with the system bus 121 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 172 may employ a Wireless Application Protocol (WAP) to establish a wireless communication channel. The communication module 172 may implement a wireless networking standard such as Institute of Electrical and Electronics Engineers (IEEE) 802.11 standard, IEEE std. 802.11-1999, published by IEEE in 1999.

Examples of mobile computing systems may be a laptop computer, a tablet computer, a Netbook, a smart phone, a personal digital assistant, or other similar device with on board processing power and wireless communications ability that is powered by a Direct Current (DC) power source that supplies DC voltage to the mobile computing system and that is solely within the mobile computing system and needs to be recharged on a periodic basis, such as a fuel cell or a battery.

Figure 2:
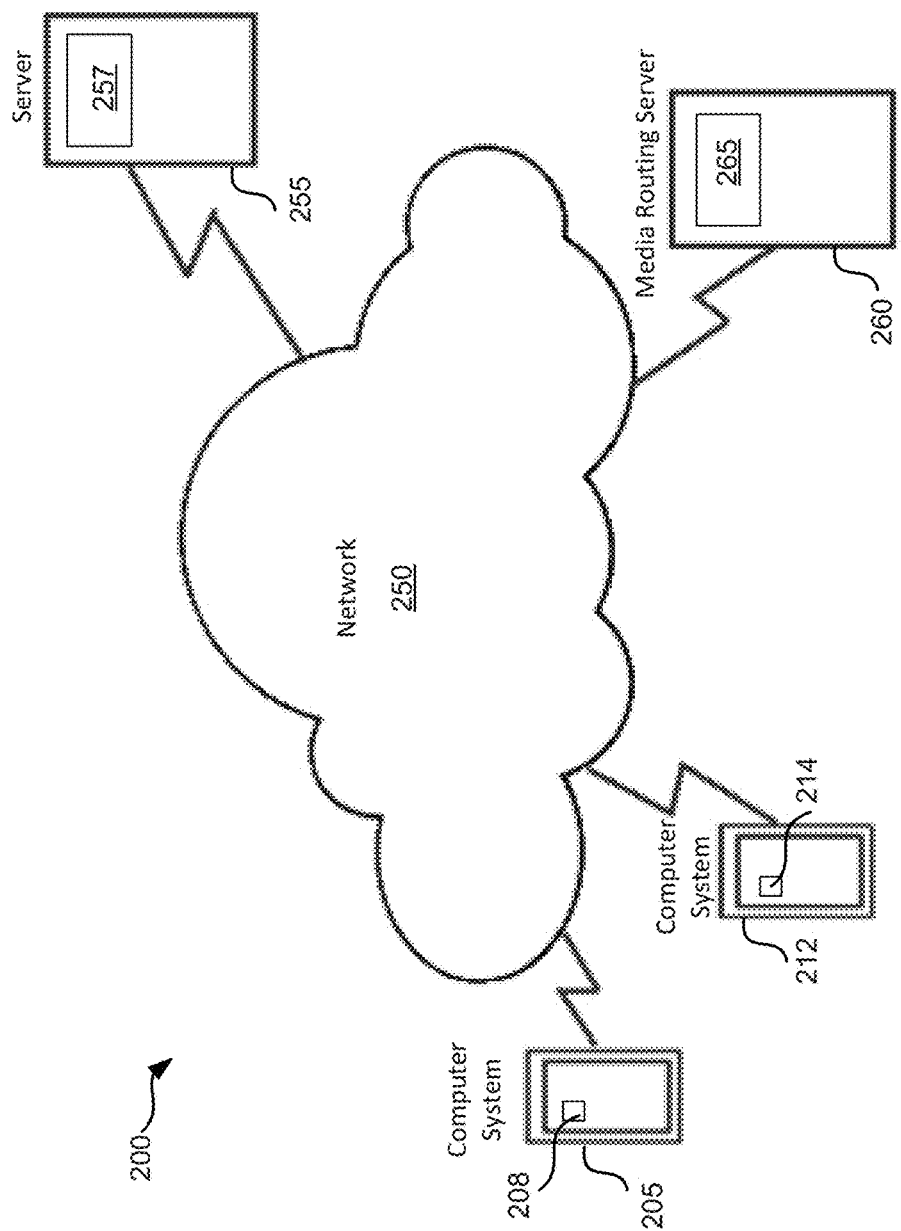
FIG. 2 shows a diagram of an example network environment 200 that may be used with some embodiments of the present invention.

FIG. 2 shows a diagram of an example network environment that may be used with some embodiments of the present invention. Network environment 200 includes computing systems 205 and 212. One or more of the computing systems 205 and 212 may be a mobile computing system. The computing systems 205 and 212 may be connected to the network 250 via a cellular connection or via a Wi-Fi router (not shown). The network 250 may be the Internet. The computing systems 205 and 212 may be coupled with one or more server computing systems 255 and 260 via the network 250.

Each of the computing systems 205 and 212 may include at least an application module (e.g., module 208 or 214). The application module 208 or 214 may be configured to generate or receive media information. A user may use the computing system 205 to connect to the server computing system 255 and log into application 257 (e.g., a Salesforce.com® application) to participate in a media sharing or exchanging session (e.g., video conferencing session, screen sharing session, audio conferencing session, etc.) with one or more other users using other computing system such as, for example, the computing system 212.

The server computing system 255 may be coupled with the server computing system 260. The server computing system 260 (referred to herein as a media routing server) may include routing application 265 configured to route media information among the computing systems (e.g., computing systems 205, 212) that participate in a media sharing or exchanging sessions. For some embodiments, the routing of the media information from a source computing system (e.g., computing system 205) to a destination computing system (e.g., computing system 212) may be performed using a set of rules. The set of rules may include rules associated with sequencing (e.g., delivering objects in order), priority (e.g., priority of objects relative to one another), source/destination (e.g., where an object is coming from or going to), caching (e.g., caching data on the server), redundancy (e.g., reduce loss and delay by sending multiple times), rate (e.g., the size of this stream in bytes per second), supersede (e.g., current object supersedes the prior object), timing (e.g., for synchronization of streams), quality (e.g., if compression then what quality level), stream identification parameters (e.g., source, type), hash code (e.g., for doing quick comparisons to similar objects), scaling (e.g., dropping portion of data), etc.

The set of rules may be applied at one or more of the source computing system, the media routing server 260, and the destination computing system. One advantage of routing the media information using rules (or rule-based routing) is that the routing application 265 can support any type of media (e.g., webcam, movie, screen sharing, music, etc.) with minimal or no change to the media routing server 260. Another advantage of rule-based routing is that the routing application 265 can be configured to adjust parameters associated with sequencing, prioritizing, scaling, etc. to control how the media information is transmitted.

For some embodiments, the media information may be tagged with attributes that describe the routing information. The attributes may be associated with the sequence, the priority, and the activity level. In general, the media routing server 260 may not know what type of media information (e.g., audio or video) it is receiving. However, the media information (which may include audio or video information) is tagged with attributes that are appropriate for handling audio or video streams. This enables the media routing server 260 to accommodate a wide range of media information without being constrained to particular media information types (or formats).

The media information may include audio streams and/or video streams generated by one or more of the computing systems 205 and 212. The media information may include multiple objects. Each object may be associated with at least priority information and sequencing information. Each object may be transmitted one after another. For example, when a media information includes ten (10) objects, each object may be associated with a sequence number and may be transmitted based on the sequence number.

Figure 3:
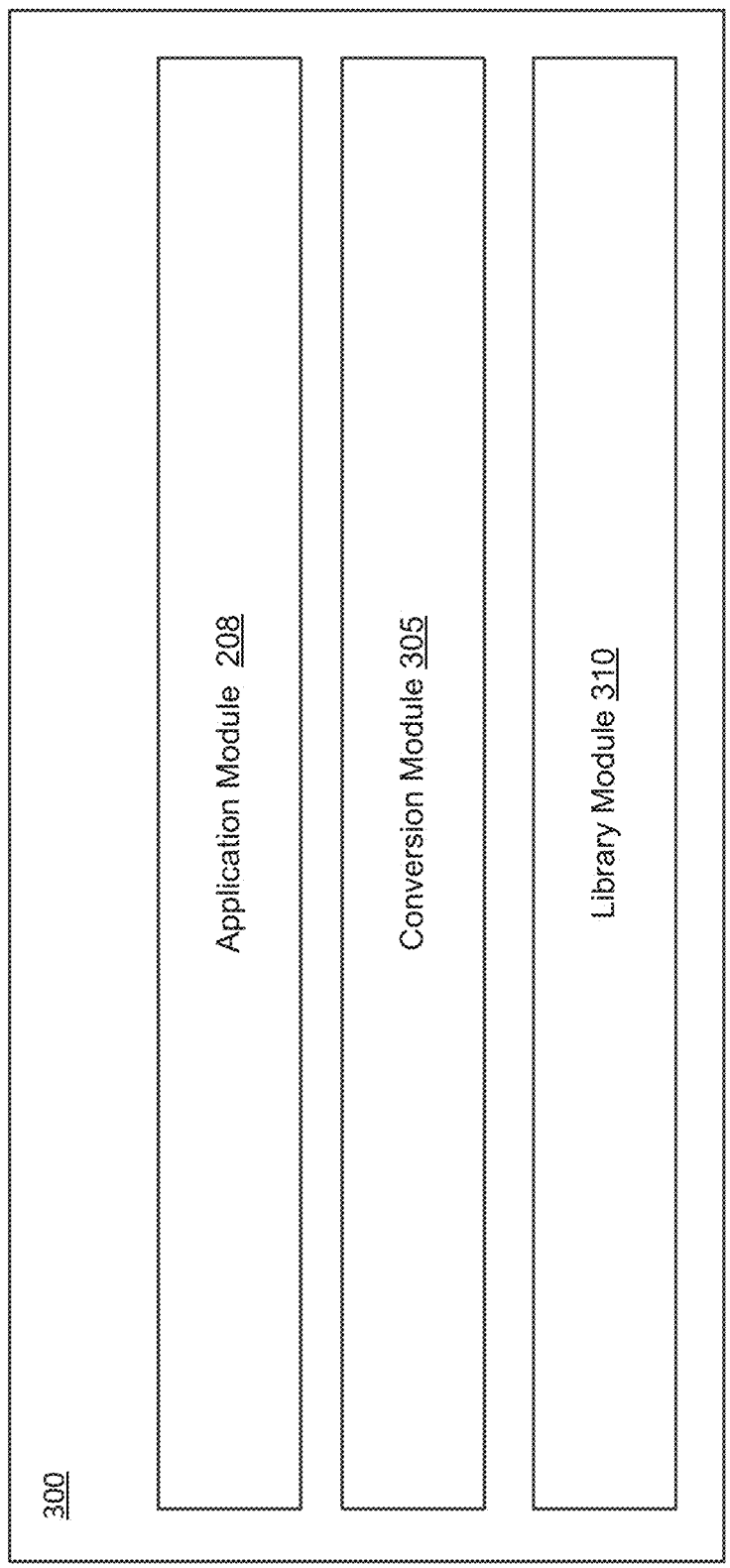
FIG. 3 shows an example of modules that may be included in a computing system that sends or receives media information, in accordance with some embodiments.

FIG. 3 shows an example of modules that may be included in a computing system that participates in a media sharing or exchanging session, in accordance with some embodiments. System 300 includes an application module 208 (also shown in FIG. 2), a conversion module 305, and a library module 310. The application module 208 may be an application that enables sharing or exchanging the media information such as, for example, a video conferencing application. A media information generated by the application module 208 may flow from application module 208 to the conversion module 305.

The conversion module 305 may include media specific transmitters (video transmitter, audio transmitter, etc.). Each media specific transmitter may be configured to convert the media information into objects of predetermined size. The conversion module 305 may also be configured to apply rules to each of the objects. There may be a set of rules for objects associated with a video stream, and there may be a set of rules for objects associated with an audio stream. The objects may then be placed into an output queue associated with the library module 310. The library module 310 may be configured to perform outbound client-side processing (compression, sequencing, prioritization, etc.). The library module 310 may be viewed as a transmitting or pumping mechanism that transmits media information into the network 250 to share with other users. The library module 310 may also serve as the receiving mechanism that receives media information shared by others via the network 250. Appropriate rules may be applied by the library module 310. The source computing system may organize the objects into a packet. The size of the packet may be determined by the network 250. There may be no correlation between object size and packet size. It may be possible that a packet may include multiple objects. The library module 310 may send the packet (and its objects) to the media routing server 260 (shown in FIG. 2) in a multiplexed stream—possibly including pieces of other objects. A computing system may be both a source computing system when it transmits the media information and a destination computing system when it receives the media information. It may be possible for the computing system to use one packet size (e.g., 1500 bytes) for transmission and another packet size (e.g., 3500 bytes) for receiving.

The media routing server 260 may performs inbound server-side processing (desegmentation, deduplication, addressing, etc.). When a packet is received by the media routing server 260, it may be added to a heap for processing. For example, if the packet is to be delivered to three destination computing systems 415-425, then it is processed for each destination computing system and then get deleted from the heap. The media routing server 260 may unpack the packets to process the objects. The media routing server 260 may transmit the objects internally from a client receiver, to one or more client transmitters depending on the addressing info. The media routing server 260 may apply rules on the receiving side and rules on the transmitting side before the objects are placed into a server output queue associated with the media routing server 260. For example, the media routing server 260 may perform outbound processing that may include sequencing, prioritization, scaling, etc. From the server output queue, the objects are transmitted to one or more destination computing systems. The transmission of the objects may be based on the bandwidth of the destination computing systems, the type of media information that the objects is associated with, and the latency factor.

At each destination computing system, the objects may be received at the input queue of the library module 310. Further rules (sequencing, decompression, scaling, prioritization, etc.) may be applied to the objects. The objects may then be transmitted to a receiver in the conversion module 305 of the destination computing system. The objects may be processed by the conversion module 305 (e.g., forming a media information based on the objects received from the media routing server). The resulting media information may then be delivered by the conversion module 305 to the application module 208 for presentation to a user at the destination computing system.

Figure 4:
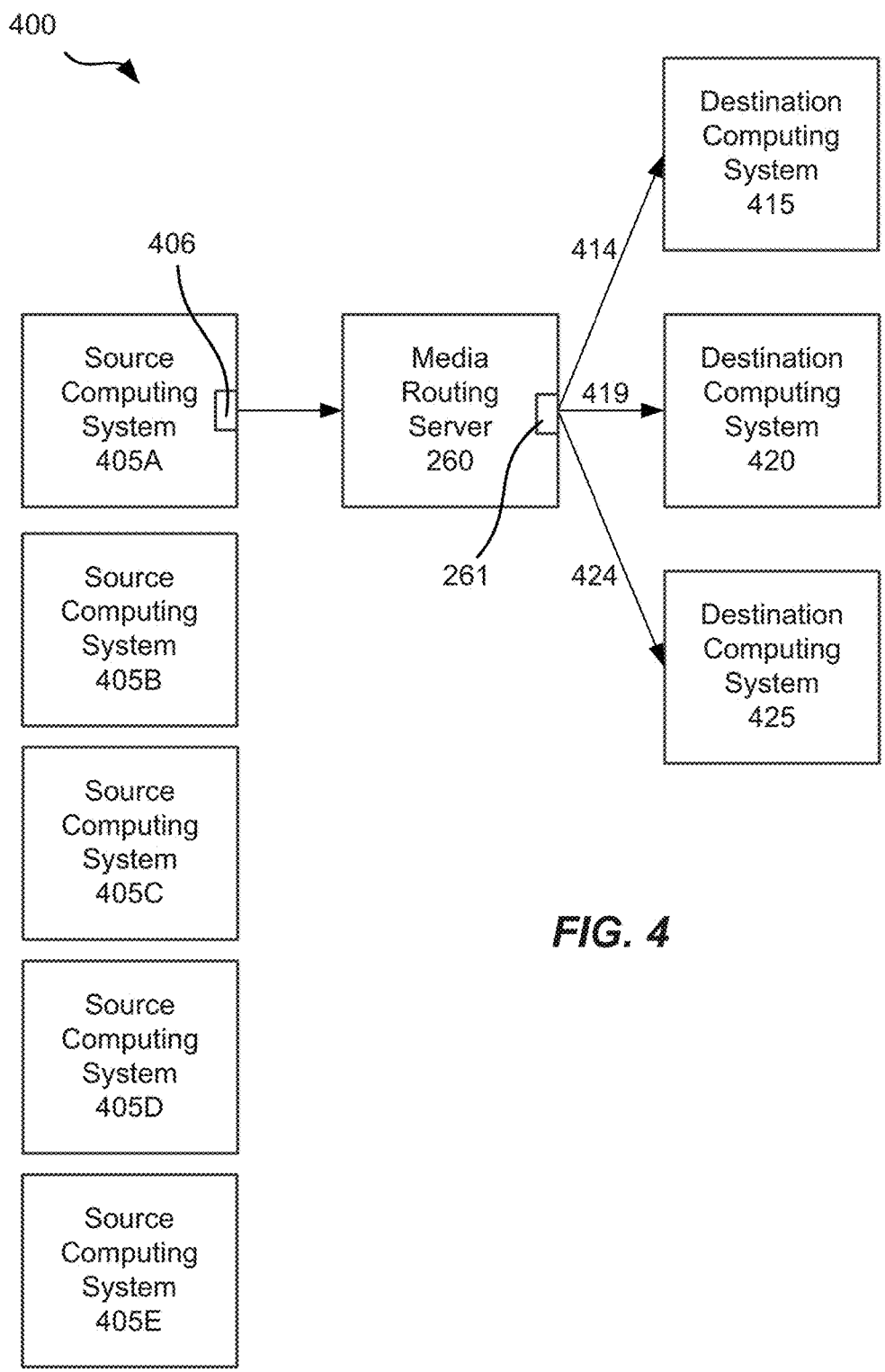
FIG. 4 shows an example diagram of computing systems participating in a media sharing or exchanging session, in accordance with some embodiments.

FIG. 4 shows an example diagram of computing systems participating in a media sharing or exchanging session, in accordance with some embodiments. Diagram 400 includes a source computing system 405A and three destination computing systems 415, 420 and 425. The source computing system 405A is configured to transmit media information to the destination computing systems 415, 420 and 425 via the media routing server 260. The source computing system 405A include an output queue 406, and the media routing server 260 includes an output queue 261.

Each of the destination computing systems 415, 420 and 425 may receive unique and appropriate amount of media information depending on its bandwidth. Some destination computing systems may receive more media information, while some may receive less. For some embodiments, the objects associated with the media information may be transmitted between the source computing system 405A and the destination computing systems 415, 420 and 425 using multiplex with one logical channel so that the objects can be easily prioritized and synchronized.

The media routing server 260 may be configured to route the media information without performing any decompressing, rendering and compressing operations. The decompressing, rendering and compressing operations may impact the performance of the media routing server 260 and may affect latency. Further, when the decompressing, rendering and compressing operations are necessary, the media information such as an audio stream or a video stream has to be completely received before such operations can be performed. By not having to perform any decompressing, rendering and compressing operations, the media routing server 260 can be easily configured to deliver the objects in the media information as soon as the objects are ready to be delivered. There is no need to wait as long as the destination computing system has enough bandwidth to receive. This keeps the latency low and enables the media routing server 260 to accommodate routing real-time media information.

For some embodiments, when the media information includes a video stream, scaling operations may be performed on the video stream. The scaling operations may include temporal scaling which uses lower frame rate, resolution scaling which uses lower resolution, and quality scaling which removes portions of the video stream. It may be noted that scaling is different from compressing or decompressing because scaling drops portions of the video stream, not compressing and decompressing it. During a media sharing or exchanging session, the scaling operations may be continuous.

The scaling operations may be performed at the output queue 406 of the source computing system 405A before the video stream is transmitted to the media routing server 260. For example, the source computing system 405A may scale a video stream to accommodate its low transmission bandwidth. The scaling operations may also be performed at the output queue 261 of the media routing server 260 before the media information is transmitted from the media routing server 260 to the destination computing system 415, 420 and 425. For example, when a user at the source computing system 405A uploads a video stream at a rate of one megabit per second, and the destination computing system 415 can only receive at a rate of 100 Kbits per second, the video stream may need to be scaled to accommodate the lower bandwidth of the destination computing system 415.

For some embodiments, the scaling of a video stream by the media routing server 260 is based on scalable video coding (SVC). The SVC may be based on the H.264/AVC standard. The scaling operations may include removing portions of the video stream to adapt to the characteristics of the destination computing system. When a video stream is to be routed by the media routing server 260 to the destination computing systems 415, 420 and 425, a collection of parallel logical channels 414, 419 and 424 may be used. Each of the logical channels 414, 419 and 424 may be associated with one or more sub-channels. Each of the sub-channels may be configured to perform operations that can be used to scale the video stream. For example, a sub-channel may be configured to control the frame rates of a video stream. This enables the media routing server 260 to selectively scale the video stream to accommodate the characteristics of the destination computing systems 415, 420 and 425.

For some embodiments, the scaling of a video stream may be performed based on a key frame (referred to as an i-frame) and succession of changes to the key frame (referred to as a p-frames). The i-frame generally includes the entire image in a frame. The p-frames generally include changes to the image from a previous frame. Using this approach, it may be possible to drop some or all of the p-frames associated with an i-frame with minimal or no effect on the quality of the image.

The scaling operations may be performed based on the type of video stream. For example, when the video stream is associated with a video conferencing application, it may be acceptable to use scaling operations that cause the video to be of lesser quality or resolution at a destination computing system. When the video stream is associated with a screen sharing application that requires text readability, it may be acceptable to use scaling operations that generate fewer updates but with more information delivered at each update.

For some embodiments, when the media information includes an audio stream, scaling operations may be performed on the audio stream. The audio stream may be a multi-point audio stream such as multiple audio streams transmitted by multiple source computing systems (e.g., source computing systems 405A-405E) and received by the media routing server 260. The multi-point audio stream may be part of an application that enables multiple users to communicate with one another such as, for example, a conference call application. In this example, a source computing system 405A may also be a destination computing system because it can also receive the audio streams from other source computing systems 405B-405E. Each audio stream may be transmitted from a microphone.

For some embodiments, the audio streams may be ranked according to voice activity level. For example, the audio streams from each of the source computing systems 405A-405E are respectively referred to as A, B, C, D, and E, and they can be ranked as C, E, A, B, D where the audio stream C (transmitted by source computing system 405C) is the highest ranked, and the audio stream D (transmitted by the source computing system 405D) is the least ranked. This may correspond to the user of the source computing system 405C has been talking most recently, and the user of the source computing system 405D has been talking least recently.

The media routing server 260 may include a distributor that prioritizes the information the media routing server 260 receives based on amount of activity, bandwidth, and other such factors. The distributor may use a buoyancy table for prioritization. For example, when a user talks loudly, the audio stream associated with that user may be given a higher priority. When that user stops talking or talk less frequently, the audio stream may be given a lower priority.

For some embodiments, a user at a source computing system may receive a set of the highest ranked audio streams where the number of streams received is a function of available bandwidth. For example, if the source computing system 405A has sufficient bandwidth for four audio streams, then a user of the source computing system 405A may receive the audio streams C, E, B, and D. If the source computing system 405E has sufficient bandwidth for two audio streams, then a user of the source computing system 405E may receive the audio streams C and B. If the source computing system 405C has sufficient bandwidth for one audio stream, then a user of the source computing system 405C may receive the audio stream E. It is assumed that a user does not want to receive own audio stream which may cause an echo effect.

When the media information includes an audio stream, lossy sequencing may be used to keep track of the order of the objects. With the lossy sequencing, when the objects are received out of order, the media routing server 260 may wait for a predetermined length of time (e.g., several milliseconds) for the out-of-order object to arrive from the source computing system 405 before giving up. The potential of the media routing server 260 giving up waiting for an out-of-order object may be reduced by using full redundancy such as, for example, transmitting the audio stream twice. With full redundancy, when an object from a first stream may be replaced by the same object from a second stream. Lossy sequencing may also be applied by a destination computing system when receiving the scaled media information from the media routing server 260.

The media routing server 260 and the destination computing systems 415, 420 and 425 may maintain periodic communication (e.g., every 15 milliseconds) so that the media routing server 260 is aware of the characteristics (e.g., bandwidth) of the destination computing systems 415, 420 and 425. This enables the media routing server 260 to transmit an optimal amount of information to each of the destination computing systems 415, 420 and 425. The media routing server 260 may also maintain frequent communication with the source computing system 405 for the same purpose.

For some embodiments, the routing of the media information from the media routing server 260 to the destination computing systems 415, 420 and 425 may be based on the Transmission Control Protocol (TCP) of the Internet Protocol (IP) suite. TCP can send information in almost any size packet. However, the TCP packets are usually split into one or more packets according to a TCP parameter called TCP window size. The one or more packets may then be sent using User Datagram Protocol (UDP). With TCP, when the packets are transmitted with a packet size that is less than the TCP window size, the packets will be transmitted using a single UDP packet. For example, if the TCP window size is 48K, and the amount of information to be transmitted is only 32K, the media routing server 260 may transmit the information using one packet. If the amount of information to be transmitted is 70K, then the media routing server 260 may transmit using two packets: the first packet at 48K, then the second packet at 22K. Using a single UDP packet may increase the timing predictability of the underlying network. It may allow transmitting large blocks of information faster because the transmission can be performed using multiple TCP connections, rather than a single TCP connection, providing higher parallelism. As such, it may be advantageous to keep the packet size to be close to the TCP window size.

The amount of information that can be transmitted between a media routing server 260 and a destination computing system 415, 420 or 425 may be based on many factors. Some of these factors may include the rate that the packets are transmitted, the size of the inbound and outbound packets, and the number of connections that is being used. Based on the network behavior, one or more of these factors may be adjusted.

For some embodiments, when it is detected that the available bandwidth has increased, the interval or rate may be adjusted. Typically, a packet may be transmitted at a constant interval of 15 milliseconds. The interval may be reduced when there is more bandwidth (e.g., increase from 40 Mbits to 100 Mbits). For example, the interval may start at 15 milliseconds and may be reduced to 10 milliseconds when more bandwidth is available.

For some embodiments, a packet size for packets that are used in streaming information between a destination computing system and a media routing server 260 may be adjusted based on the available bandwidth. For example, if the media routing server 260 is currently streaming data with 32 Kbits per packet based on the available bandwidth, and it is determined that the available bandwidth increases by 50%, then the packet size may be increased from 32 Kbits to 48 Kbits per packet, a 50% increase. However, since the transmission may be constrained by the maximum window size (e.g., 64 Kbits) used by an underlying protocol, adjusting the packet size may not fully utilize the higher bandwidth. For example, if the current packet size is 48 Kbits per packet based on the current bandwidth, and it is determined that the available bandwidth increases by 100%, the packet size cannot be increased by 100% going from 48 Kbits to 96 Kbits because maximum window size of the protocol is set at 64 Kbits.

For some embodiments, a number of simultaneous connections used for the streaming of information may be increased from a first number of simultaneous connections to a second number of simultaneous connections. This may be based on the determining that there is an increase in available bandwidth and that the current packet size is equal to a maximum packet size for a protocol used for the streaming information (e.g., TCP window size). For example, when the available bandwidth increases 100%, the number of simultaneous connections used for the streaming of information may be increased from twelve (12) simultaneous connections to twenty (20) simultaneous connections, reflecting a 67% increase. If the current packet size is 48 Kbits and the maximum packet size for the protocol is 64 Kbits, then an increase of the packet size to the maximum packet size only provides a 33% increase. In this example, the increase in the number of connections may better utilize the available bandwidth than the increase in packet size. This approach is limited only by the number of available simultaneous connections and not by the maximum window size of the underlying protocol.

Figure 5:
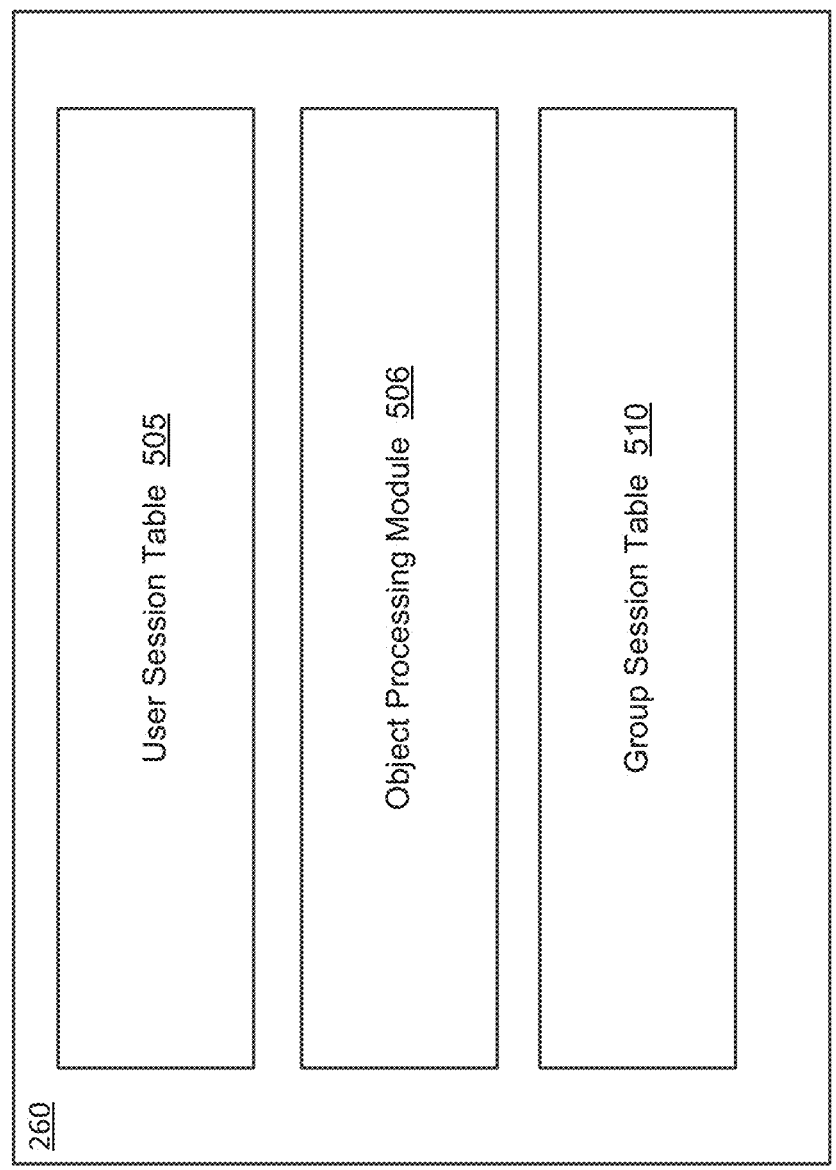
FIG. 5 shows an example of session table that may be used by a media routing server, in accordance with some embodiments.

FIG. 5 shows an example of session table that may be used by a media routing server, in accordance with some embodiments. The media routing server 260 may establish a user session table (UST) 505 and a group session table (GST) 510. A user session is established for each computing system associated with the media routing server. A user session may include information (e.g., address, bandwidth, etc.) about a particular computing system. The user session is stored in the UST 505. Each user session is associated with a group session. A group session may include multiple user sessions that correspond to the multiple computing systems (e.g., computing systems 405, 415, 420, 425 shown in FIG. 4) that participate in the same media sharing or exchanging session. The group session is stored in the GST 510. The UST 505 may be associated with an object processing module 506 that processes or unpacks the incoming objects from the source computing system 405. The object processing module 506 may tag or assign delivery characteristics (e.g., sequence number, priority, etc.) to the objects for transmission. The media routing server 260 may be configured to use the information in a group session to determine how to route the objects to the destination computing systems 415, 420 and 425.

Figure 6A:
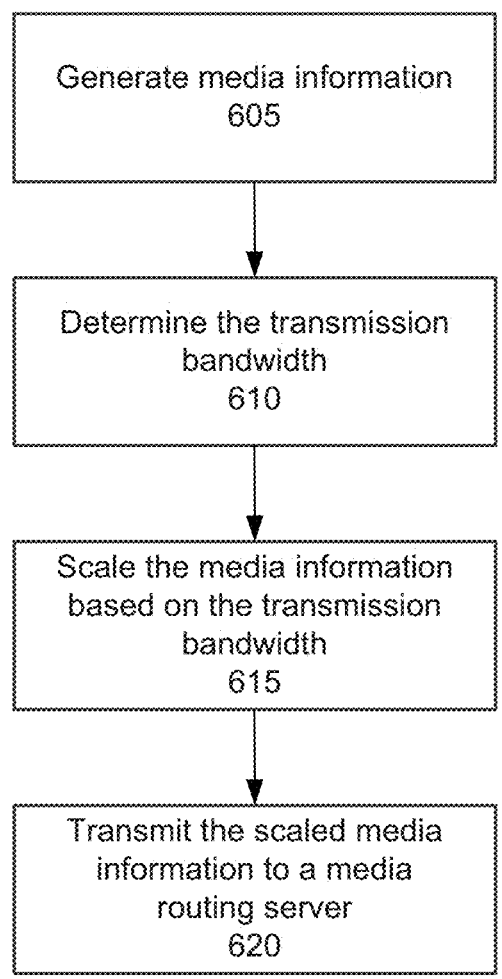
FIG. 6A shows a flowchart of an example process for transmitting scaled media information, performed in accordance with some embodiments.

FIG. 6A shows a flowchart of an example process for transmitting scaled media information, performed in accordance with some embodiments. The method 600 may be performed by a source computing system to route the media information from a source computing system to a media routing server. At block 605, the media information may be generated by an application in the source computing system. At block 610, the transmission bandwidth of the source computing system may be determined. At block 615, the media information may be scaled based on the bandwidth. At block 620, the scaled media information may be transmitted to the media routing server.

Figure 6B:
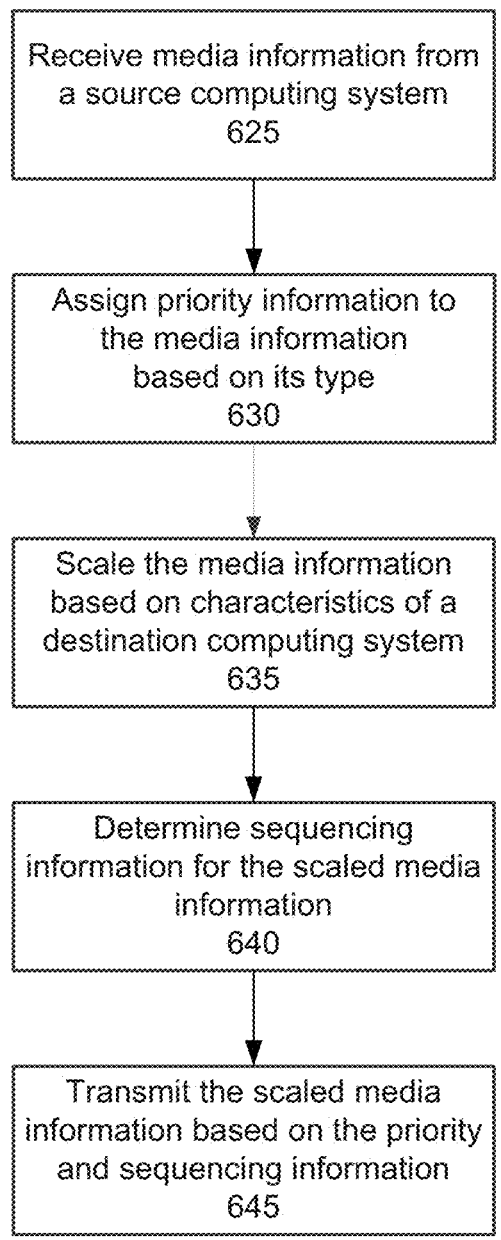
FIG. 6B shows a flowchart of an example process for routing media information to destination computing systems, performed in accordance with some embodiments.

FIG. 6B shows a flowchart of an example process for routing media information to destination computing systems, performed in accordance with some embodiments. The method 622 may be performed by a media routing server after receiving the media information from a source computing system. At block 625, the media information is received from a source computing system. At block 630, rules may be applied to assign priority to the media information. At block 635, rules may be applied to scale the media information. The rules may take into consideration the characteristics of the destination computing systems. At block 640, rules may be applied to apply sequencing to the media information. The rules may be applied by the object processing module 506 (shown in FIG. 5). At block 645, the processed media information may be transmitted to a destination computing system.

Figure 7:
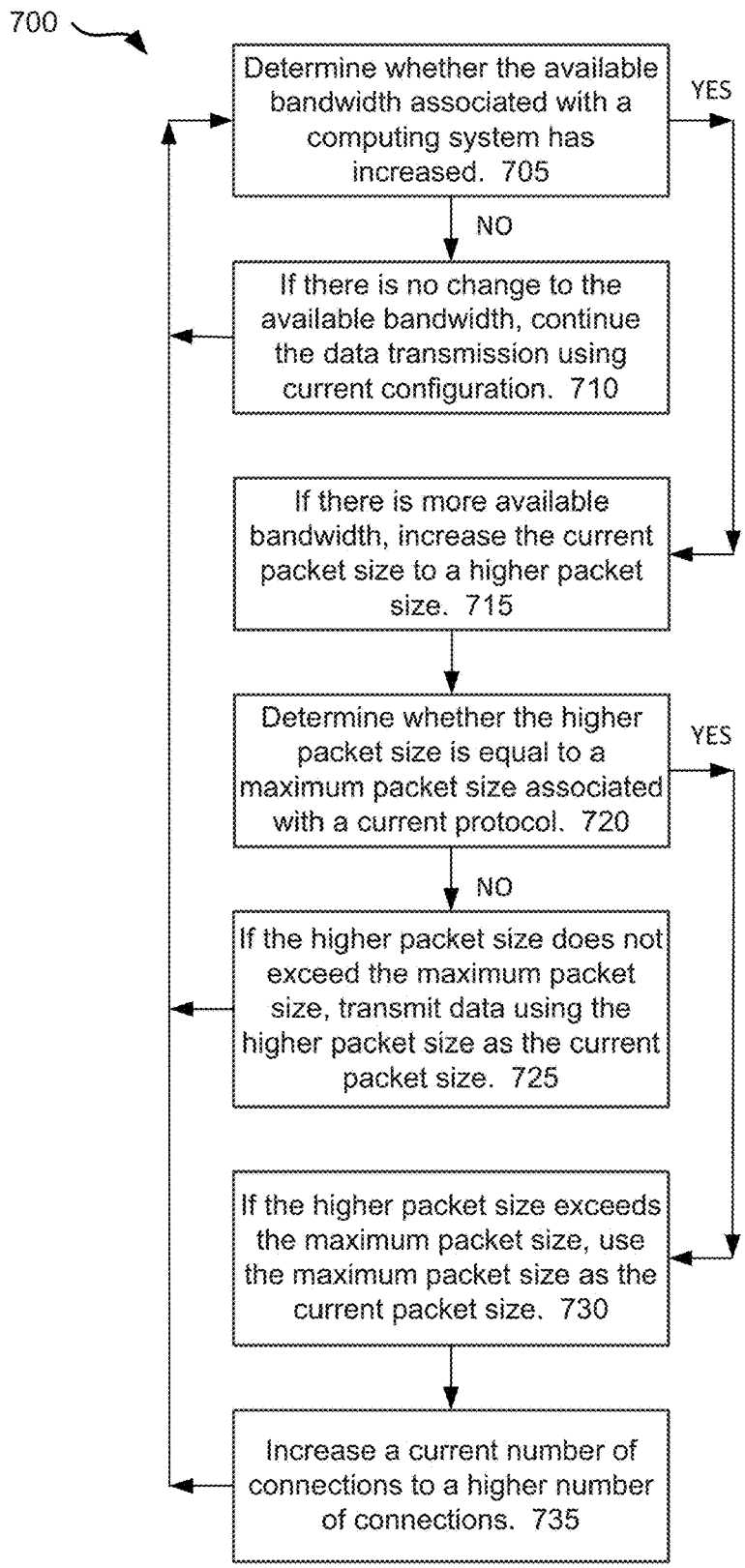
FIG. 7 shows a flowchart of an example process for adjusting packet size and connections based on available bandwidth, performed in accordance with some embodiments.

FIG. 7 shows a flowchart of an example process for adjusting packet size and connections based on available bandwidth, performed in accordance with some embodiments. The method 700 may be performed by a media routing server while streaming information to a destination computing system. A media routing server may be transmitting information to a destination computing system using certain transmission configuration such as, for example, 32 Kbits packet size, twelve (12) simultaneous connections, 15 milliseconds interval, etc.) At block 705, the media routing server may periodically check to determine whether there is an increase in the available bandwidth. If there is no increase, the process flows to block 710, and the transmission of information between the media routing server and the destination computing system may continue with the current configuration.

From block 705, if there is an increase, the process flows to block 715, where the packet size may be increased. The increase in the packet size may vary and may be based on the increase in the bandwidth. For example, if the bandwidth is increased by 50%, then the packet size may be increased by 50%. For example, if the current packet size is 32 Kbits and the available bandwidth increases by 50%, then the packet size may be increased by 50% from 32 Kbits to 48 Kbits.

At block 720, the media routing server may check whether the increased packet size is equal to the protocol window size (or maximum packet size). If it is not equal to the maximum packet size, the process flows to block 725 where the transmission of the information may continue with the higher packet size. From block 720, if the increased packet size is more than the maximum packet size, then the packet size may need to be adjusted. For some embodiments, the packet size may be set to be the same as the maximum packet size, as shown in block 730.

At block 735, the number of simultaneous connections may be increased to a higher number of simultaneous connections (e.g., 12 connections to 20 connections). For some embodiments, the packet size and the number of simultaneous connections may likewise be adjusted downward when there is a decrease in the available bandwidth. For some embodiments, when there is a change in the bandwidth and the change is determined to be minimal or not sufficiently significant, the existing transmission configuration may be maintained.

Figure 8A:
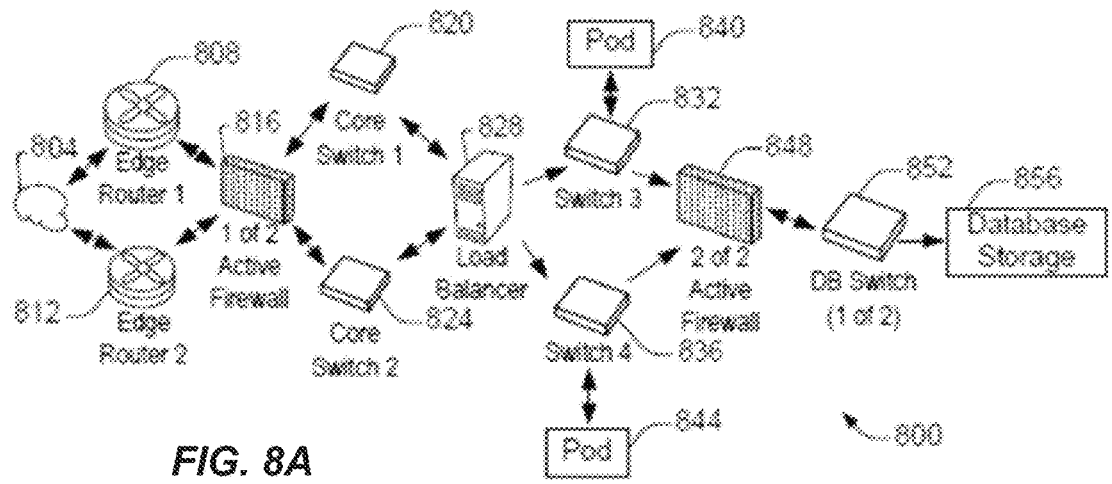
FIG. 8A shows a system diagram 800 illustrating architectural components of an applicable environment, in accordance with some embodiments.

FIG. 8A shows a system diagram 800 illustrating architectural components of an on-demand service environment, in accordance with some embodiments. A client machine located in the cloud 804 (or Internet) may communicate with the on-demand service environment via one or more edge routers 808 and 812. The edge routers may communicate with one or more core switches 820 and 824 via firewall 816. The core switches may communicate with a load balancer 828, which may distribute server load over different pods, such as the pods 840 and 844. The pods 840 and 844, which may each include one or more servers and/or other computing resources, may perform data processing and other operations used to provide on-demand services. Communication with the pods may be conducted via pod switches 832 and 836. Components of the on-demand service environment may communicate with a database storage system 856 via a database firewall 848 and a database switch 852.

Figure 8B:
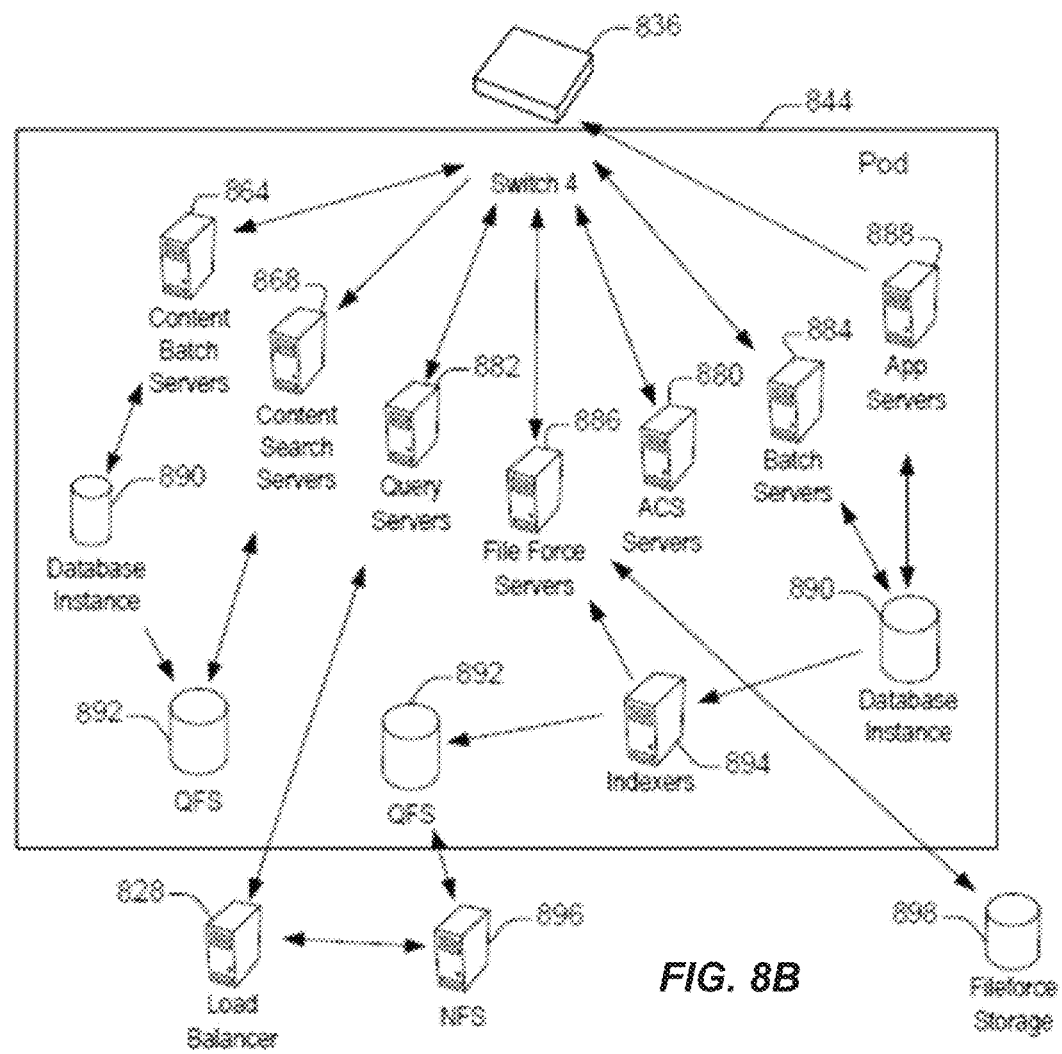
FIG. 8B shows a system diagram further illustrating architectural components of an applicable environment, in accordance with some embodiments.

As shown in FIGS. 8A and 8B, accessing an on-demand service environment may involve communications transmitted among a variety of different hardware and/or software components. Further, the on-demand service environment 800 is a simplified representation of an actual on-demand service environment. For example, while only one or two devices of each type are shown in FIGS. 8A and 8B, some embodiments of an on-demand service environment may include anywhere from one to many devices of each type. Also, the on-demand service environment need not include each device shown in FIGS. 8A and 8B, or may include additional devices not shown in FIGS. 8A and 8B.

Moreover, one or more of the devices in the on-demand service environment 800 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 804 is intended to refer to a data network or plurality of data networks, often including the Internet. Client machines located in the cloud 804 may communicate with the on-demand service environment to access services provided by the on-demand service environment. For example, client machines may access the on-demand service environment to retrieve, store, edit, and/or process information.

In some embodiments, the edge routers 808 and 812 route packets between the cloud 804 and other components of the on-demand service environment 800. The edge routers 808 and 812 may employ the Border Gateway Protocol (BGP). The BGP is the core routing protocol of the Internet. The edge routers 808 and 812 may maintain a table of IP networks or 'prefixes' which designate network reachability among autonomous systems on the Internet.

In one or more embodiments, the firewall 816 may protect the inner components of the on-demand service environment 800 from Internet traffic. The firewall 816 may block, permit, or deny access to the inner components of the on-demand service environment 800 based upon a set of rules and other criteria. The firewall 816 may act as one or more of a packet filter, an application gateway, a stateful filter, a proxy server, or any other type of firewall.

In some embodiments, the core switches 820 and 824 are high-capacity switches that transfer packets within the on-demand service environment 800. The core switches 820 and 824 may be configured as network bridges that quickly route data between different components within the on-demand service environment. In some embodiments, the use of two or more core switches 820 and 824 may provide redundancy and/or reduced latency.

In some embodiments, the pods 840 and 844 may perform the core data processing and service functions provided by the on-demand service environment. Each pod may include various types of hardware and/or software computing resources. An example of the pod architecture is discussed in greater detail with reference to FIG. 8B.

In some embodiments, communication between the pods 840 and 844 may be conducted via the pod switches 832 and 836. The pod switches 832 and 836 may facilitate communication between the pods 840 and 844 and client machines located in the cloud 804, for example via core switches 820 and 824. Also, the pod switches 832 and 836 may facilitate communication between the pods 840 and 844 and the database storage 856.

In some embodiments, the load balancer 828 may distribute workload between the pods 840 and 844. Balancing the on-demand service requests between the pods may assist in improving the use of resources, increasing throughput, reducing response times, and/or reducing overhead. The load balancer 828 may include multilayer switches to analyze and forward traffic.

In some embodiments, access to the database storage 856 may be guarded by a database firewall 848. The database firewall 848 may act as a computer application firewall operating at the database application layer of a protocol stack. The database firewall 848 may protect the database storage 856 from application attacks such as structure query language (SQL) injection, database rootkits, and unauthorized information disclosure.

In some embodiments, the database firewall 848 may include a host using one or more forms of reverse proxy services to proxy traffic before passing it to a gateway router. The database firewall 848 may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some embodiments, communication with the database storage system 856 may be conducted via the database switch 852. The multi-tenant database system 856 may include more than one hardware and/or software components for handling database queries. Accordingly, the database switch 852 may direct database queries transmitted by other components of the on-demand service environment (e.g., the pods 840 and 844) to the correct components within the database storage system 856. In some embodiments, the database storage system 856 is an on-demand database system shared by many different organizations. The on-demand database system may employ a multi-tenant approach, a virtualized approach, or any other type of database approach. An on-demand database system is discussed in greater detail with reference to FIGS. 9 and 10.

FIG. 8B shows a system diagram illustrating the architecture of the pod 844, in accordance with one embodiment. The pod 844 may be used to render services to a user of the on-demand service environment 800. In some embodiments, each pod may include a variety of servers and/or other systems. The pod 844 includes one or more content batch servers 864, content search servers 868, query servers 872, file force servers 876, access control system (ACS) servers 880, batch servers 884, and app servers 888. Also, the pod 844 includes database instances 890, quick file systems (QFS) 892, and indexers 894. In one or more embodiments, some or all communication between the servers in the pod 844 may be transmitted via the switch 836.

In some embodiments, the application servers 888 may include a hardware and/or software framework dedicated to the execution of procedures (e.g., programs, routines, scripts) for supporting the construction of applications provided by the on-demand service environment 800 via the pod 844. Some such procedures may include operations for providing the services described herein. The content batch servers 864 may requests internal to the pod. These requests may be long-running and/or not tied to a particular customer. For example, the content batch servers 864 may handle requests related to log mining, cleanup work, and maintenance tasks.

The content search servers 868 may provide query and indexer functions. For example, the functions provided by the content search servers 868 may allow users to search through content stored in the on-demand service environment. The Fileforce servers 876 may manage requests information stored in the Fileforce storage 878. The Fileforce storage 878 may store information such as documents, images, and basic large objects (BLOBs). By managing requests for information using the Fileforce servers 876, the image footprint on the database may be reduced.

The query servers 872 may be used to retrieve information from one or more file systems. For example, the query system 872 may receive requests for information from the app servers 888 and then transmit information queries to the NFS 896 located outside the pod. The pod 844 may share a database instance 890 configured as a multi-tenant environment in which different organizations share access to the same database. Additionally, services rendered by the pod 844 may require various hardware and/or software resources. In some embodiments, the ACS servers 880 may control access to data, hardware resources, or software resources.

In some embodiments, the batch servers 884 may process batch jobs, which are used to run tasks at specified times. Thus, the batch servers 884 may transmit instructions to other servers, such as the app servers 888, to trigger the batch jobs. In some embodiments, the QFS 892 may be an open source file system available from Sun Microsystems® of Santa Clara, Calif. The QFS may serve as a rapid-access file system for storing and accessing information available within the pod 844. The QFS 892 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 868 and/or indexers 894 to identify, retrieve, move, and/or update data stored in the network file systems 896 and/or other storage systems.

In some embodiments, one or more query servers 872 may communicate with the NFS 896 to retrieve and/or update information stored outside of the pod 844. The NFS 896 may allow servers located in the pod 844 to access information to access files over a network in a manner similar to how local storage is accessed. In some embodiments, queries from the query servers 822 may be transmitted to the NFS 896 via the load balancer 820, which may distribute resource requests over various resources available in the on-demand service environment. The NFS 896 may also communicate with the QFS 892 to update the information stored on the NFS 896 and/or to provide information to the QFS 892 for use by servers located within the pod 844.

In some embodiments, the pod may include one or more database instances 890. The database instance 890 may transmit information to the QFS 892. When information is transmitted to the QFS, it may be available for use by servers within the pod 844 without requiring an additional database call. In some embodiments, database information may be transmitted to the indexer 894. Indexer 894 may provide an index of information available in the database 890 and/or QFS 892. The index information may be provided to file force servers 876 and/or the QFS 892.

Figure 9:
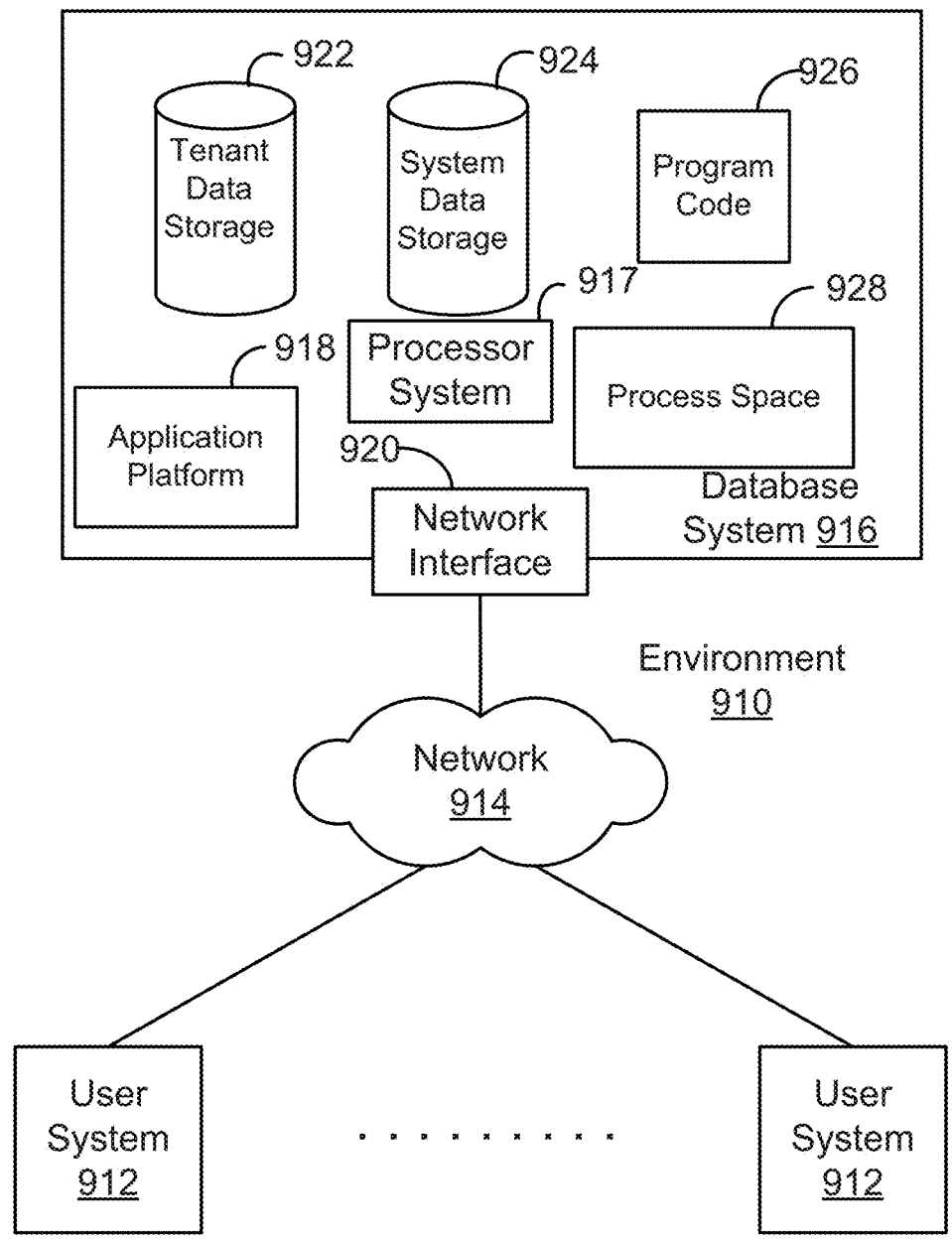
FIG. 9 shows a system diagram 910 illustrating the architecture of a multitenant database environment, in accordance with some embodiments.
Figure 10:
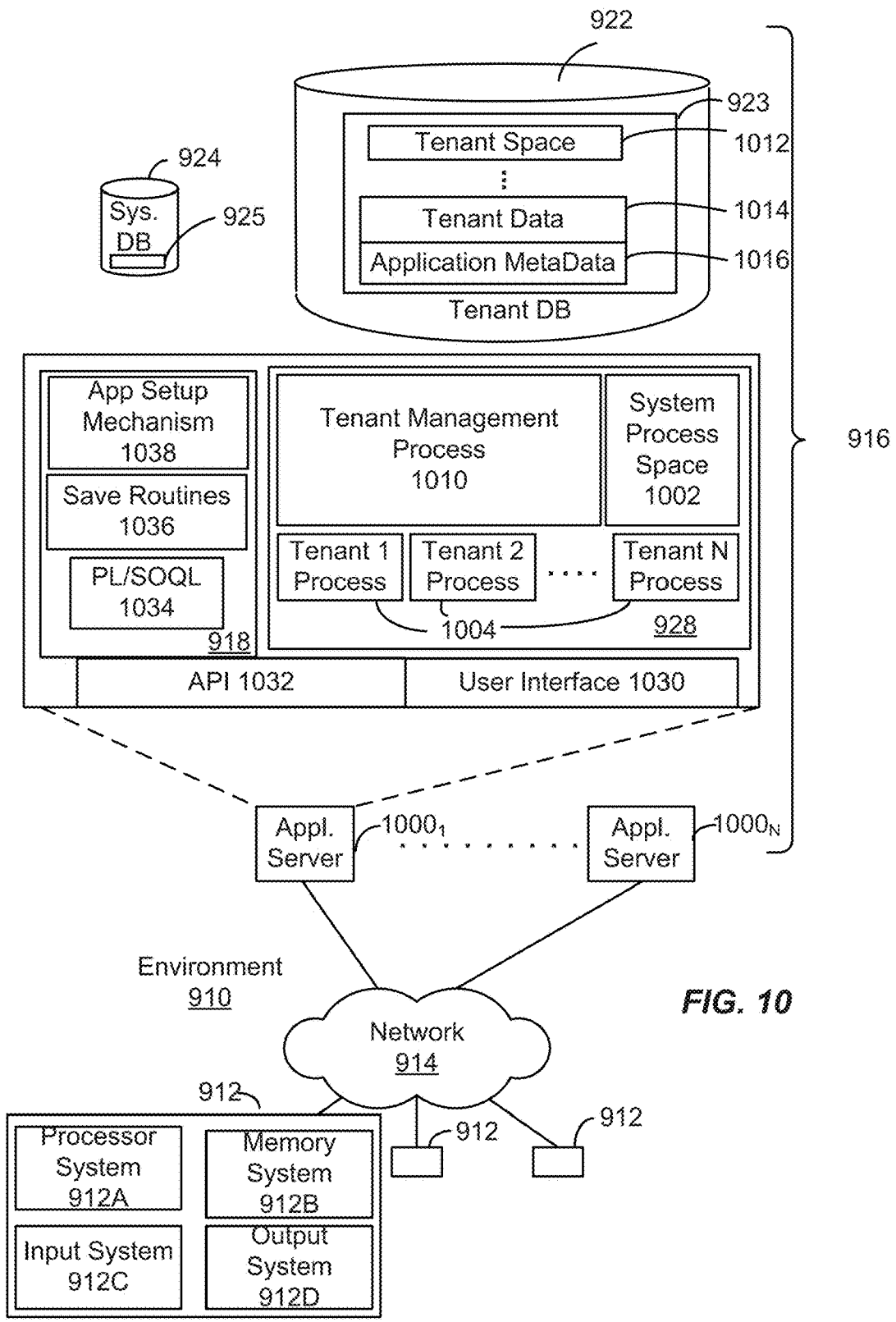
FIG. 10 shows a system diagram 910 further illustrating the architecture of a multitenant database environment, in accordance with some embodiments.

FIG. 9 shows a block diagram of an environment 910 wherein an on-demand database service might be used, in accordance with some embodiments. Environment 910 includes an on-demand database service 916. User system 912 may be any machine or system that is used by a user to access a database user system. For example, any of user systems 912 can be a handheld computing system, a mobile phone, a laptop computer, a work station, and/or a network of computing systems. As illustrated in FIGS. 9 and 10, user systems 912 might interact via a network 914 with the on-demand database service 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" will be used interchangeably herein. A database image may include one or more database objects. A relational database management system (RDBMS) or the equivalent may execute storage and retrieval of information against the database object(s). Application platform 918 may be a framework that allows the applications of system 916 to run, such as the hardware and/or software, e.g., the operating system. In an implementation, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

The users of user systems 912 may differ in their respective capacities, and the capacity of a particular user system 912 might be entirely determined by permissions (permission levels) for the current user. For example, where a call center agent is using a particular user system 912 to interact with system 916, the user system 912 has the capacities allotted to that call center agent. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some embodiments are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some embodiments, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In some embodiments, system 916, shown in FIG. 9, implements a web-based customer relationship management (CRM) system. For example, in some embodiments, system 916 includes application servers configured to implement and execute CRM software applications as well as provide related data, code, forms, web pages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 916 implements applications other than, or in addition to, a CRM application. For example, system 916 may provide tenant access to multiple hosted (standard and custom) applications. User (or third party developer) applications, which may or may not include CRM, may be supported by the application platform 918, which manages creation, storage of the applications into one or more database objects and executing of the applications in a virtual machine in the process space of the system 916.

Each user system 912 could include a desktop personal computer, workstation, laptop, PDA, cell phone, or any wireless access protocol (WAP) enabled device or any other computing system capable of interfacing directly or indirectly to the Internet or other network connection. User system 912 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 912 to access, process and view information, pages and applications available to it from system 916 over network 914.

Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to some embodiments, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units.

A computer program product implementation includes a machine-readable storage medium (media) having instructions stored thereon/in which can be used to program a computer to perform any of the processes of the embodiments described herein. Computer code for operating and configuring system 916 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for implementing embodiments can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to some embodiments, each system 916 is configured to provide web pages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 10 also shows a block diagram of environment 910 further illustrating system 916 and various interconnections, in accordance with some embodiments. FIG. 10 shows that user system 912 may include processor system 912A, memory system 912B, input system 912C, and output system 912D. FIG. 10 shows network 914 and system 916. FIG. 10 also shows that system 916 may include tenant data storage 922, tenant data 923, system data storage 924, system data 925, User Interface (UI) 1030, Application Program Interface (API) 1032, PL/SOQL 1034, save routines 1036, application setup mechanism 1038, applications servers 10001-1000N, system process space 1002, tenant process spaces 1004, tenant management process space 1010, tenant storage area 1012, user storage 1014, and application metadata 1016. In other embodiments, environment 910 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of processors. Memory system 912B may be any combination of one or more memory devices, short term, and/or long term memory. Input system 912C may be any combination of input devices, such as keyboards, mice, trackballs, scanners, cameras, and/or interfaces to networks. Output system 912D may be any combination of output devices, such as monitors, printers, and/or interfaces to networks. As shown by FIG. 10, system 916 may include a network interface 920 (of FIG. 9) implemented as a set of HTTP application servers 1000, an application platform 918, tenant data storage 922, and system data storage 924. Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes to users and/or developers at user systems 912. The tenant data and the system data may be stored in various databases, such as Oracle™ databases.

Application platform 918 includes an application setup mechanism 1038 that supports application developers' creation and management of applications, which may be saved as metadata into tenant data storage 922 by save routines 1036 for execution by subscribers as tenant process spaces 1004 managed by tenant management process 1010 for example. Invocations to such applications may be coded using PL/SOQL 34 that provides a programming language style interface extension to API 1032. A detailed description of some PL/SOQL language embodiments is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is hereby incorporated by reference in its entirety and for all purposes. Invocations to applications may be detected by system processes, which manage retrieving application metadata 1016 for the subscriber making the invocation and executing the metadata as an application in a virtual machine.

Each application server 1000 may be communicably coupled to database systems, e.g., having access to system data 925 and tenant data 923, via a different network connection. For example, one application server 10001 might be coupled via the network 914 (e.g., the Internet), another application server 1000N-1 might be coupled via a direct network link, and another application server 1000N might be coupled by yet a different network connection. Transfer Control Protocol and Internet Protocol (TCP/IP) are typical protocols for communicating between application servers 1000 and the database system. However, other transport protocols may be used to optimize the system depending on the network interconnect used.

In certain embodiments, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In some embodiments, therefore, an interface system implementing a load balancing function (e.g., an F5 Big-IP load balancer) is communicably coupled between the application servers 1000 and the user systems 912 to distribute requests to the application servers 1000. In some embodiments, the load balancer uses a least connections algorithm to route user requests to the application servers 1000. Other examples of load balancing algorithms, such as round robin and observed response time, also can be used. For example, in certain embodiments, three consecutive requests from the same user could hit three different application servers 1000, and three requests from different users could hit the same application server 1000. In this manner, system 916 is multi-tenant, wherein system 916 handles storage of, and access to, different objects, data and applications across disparate users and organizations.

As an example of storage, one tenant might be a company that employs a sales force where each call center agent uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain embodiments, user systems 912 (which may be client machines/systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more SQL statements (e.g., SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some embodiments. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some embodiments, for example, all custom entity data rows are stored in a single multi-tenant physical table, which may contain multiple logical tables per organization. In some embodiments, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more embodiments and techniques are described with reference to an implementation in which a service cloud console is implemented in a system having an application server providing a front end for an on-demand database service capable of supporting multiple tenants, the one or more embodiments and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While various embodiments have been described herein, it should be understood that they have been presented by way of example only, and not limitation. Thus, the breadth and scope of the present application should not be limited by any of the embodiments described herein, but should be defined only in accordance with the following and later-submitted claims and their equivalents.

What is claimed is:

1. A method for streaming real-time media information during a real-time media sharing session based on available bandwidth in a network, the method comprising:
   receiving, by a media routing server coupled to the network, the real-time media information to be streamed to at least one of a plurality of destination computing systems from one of a plurality of source computing systems during the real-time media sharing session;
   monitoring and detecting, by the media routing server, for an increase in available bandwidth between the media routing server and the at least one destination computing system;
   increasing, by the media routing server, a packet size used for streaming the real-time media information from a first packet size to a second packet size based on an identified increase in the available bandwidth between the media routing server and the at least one destination computing system;
   determining, by the media routing server, that the second packet size exceeds a maximum packet size for an underlying protocol currently being used to stream the real-time media information;
   increasing, by the media routing server, a number of simultaneous connections used for streaming the real-time media information from a first number of simultaneous connections to a second number of simultaneous connections in response to the identified increase in the available bandwidth between the media routing server and the at least one destination computer and in response to the determination that the second packet size exceeds the maximum packet size; and
   transmitting, by the media routing server, the real-time media information using the maximum packet size and the second number of simultaneous connections to the at least one destination computing system.

2. The method of claim 1, wherein said increasing of the packet size from the first packet size to the second packet size is based on an increase amount of the identified increase in the available bandwidth.

3. The method of claim 1, wherein said increasing of the number of simultaneous connections from the first number of simultaneous connections to the second number of simultaneous connections is based on an increase amount of the identified increase in the available bandwidth.

4. The method of claim 1, further comprising increasing one or more of a packet size and a number of simultaneous connections associated with streaming the real-time media information to a second computing system based on an identified increase in available bandwidth associated with the second computing system.

5. The method of claim 1, further comprising increase a transmission rate for transmission of information based on the identified increase in the available bandwidth.

6. An apparatus for streaming real-time media information during a real-time media sharing session based on available bandwidth in a network, the apparatus comprising:
   a processor; and
   a non-transitory computer readable medium storing a plurality of instructions which, when executed by the processor, cause the processor to:
      receive, by a media routing server coupled to the network, the real-time media information to be streamed to at least one of a plurality of destination computing systems from one of a plurality of source computing systems during the real-time media sharing session;
      monitoring and detecting, by the media routing server, for an increase in available bandwidth between the media routing server and the at least one destination computing system;
      increase, by the media routing server, a packet size used for streaming the real-time media information from a first packet size to a second packet size based on an identified increase in the available bandwidth between the media routing server and the at least one destination computing system;
      determine, by the media routing server, that the second packet size exceeds a maximum packet size for an underlying protocol currently being used to stream the real-time media information;
      increase, by the media routing server, a number of simultaneous connections used for streaming the real-time media information from a first number of simultaneous connections to a second number of simultaneous connections in response to the identified increase in the available bandwidth between the media routing server and the at least one destination computer and in response to the determination that the second packet size exceeds the maximum packet size; and
      transmit, by the media routing server, the real-time media information using the maximum packet size and the second number of simultaneous connections to the at least one destination computing system.

7. The apparatus of claim 6, wherein the packet size is increased from the first packet size to the second packet size based on an increase amount of the identified increase in the available bandwidth.

8. The apparatus of claim 6, wherein the number of simultaneous connections is increased from the first number of simultaneous connections to the second number of simultaneous connections based on an increase amount of the identified increase in the available bandwidth.

9. The apparatus of claim 6, wherein the sequences of instructions, when executed by the processor, further cause the processor to increase one or more of a packet size and a number of simultaneous connections associated with streaming the real-time media information to a second computing system based on an identified increase in the available bandwidth associated with the second computing system.

10. The apparatus of claim 6, wherein the sequences of instructions, when executed by the processor, further cause the processor to increase a transmission rate for transmission of information based on the identified increase in the available bandwidth.

11. A computer program product for streaming real-time media information during a real-time media sharing session based on available bandwidth in a network comprising a non-transitory computer-readable medium having computer-readable program code embodied therein to be executed by one or more processors, the program code including instructions to:

receive, by a media routing server coupled to the network, the real-time media information to be streamed to at least one of a plurality of destination computing systems from one of a plurality of source computing systems during the real-time media sharing session;

monitor and detecting, by the media routing server, for an increase in available bandwidth between the media routing server and the at least one destination computing system;

increase, by the media routing server, a packet size used for streaming the real-time media information from a first packet size to a second packet size based on an identified increase in the available bandwidth between the media routing server and the at least one destination computing system;

determine, by the media routing server, that if the second packet size exceeds a maximum packet size for an underlying protocol currently being used to stream the real-time media information;

increase, by the media routing server, a number of simultaneous connections used for streaming the real-time media information from a first number of simultaneous connections to a second number of simultaneous connections in response to the identified increase in the available bandwidth between the media routing server and the at least one destination computer and in response to the determination that the second packet size exceeds the maximum packet size; and transmit, by the media routing server, the real-time media information using the maximum packet size and the second number of simultaneous connections to the at least one destination computing system.

12. The computer program product of claim 11, wherein the packet size is increased from the first packet size to the second packet size based on an increase amount of the identified increase in the available bandwidth.

13. The computer program product of claim 11, wherein the number of simultaneous connections is increased from the first number of simultaneous connections to the second number of simultaneous connections based on an increase amount of the identified increase in the available bandwidth.

14. The computer program product of claim 11, wherein the program code includes further instructions to increase one or more of a packet size and a number of simultaneous connections associated with streaming the real-time media information to a second computing system based on an identified increase in the available bandwidth associated with the second computing system.

15. The computer program product of claim 11, wherein the program code includes further instructions to increase a transmission rate for transmission of information based on the identified increase in the available bandwidth.

\* \* \* \* \*